United States Patent Office 3,201,407
Patented Aug. 17, 1965

3,201,407
COMPOUNDS USEFUL IN THE PREVENTION
OF DENTAL CARIES
Alexander Galat, 126 Buckingham Road, Yonkers, N.Y.
No Drawing. Filed Feb. 11, 1963, Ser. No. 257,743
4 Claims. (Cl. 260—297.5)

This invention relates to new chemical compounds useful in the prevention of dental caries and to compositions of matter containing one or more of said compounds.

Tooth decay is a major problem in many areas of the world. In the United States for example, it has been estimated that more than 90% of the population is afflicted with this condition.

While the precise causes of tooth decay are still not known with certainty, it has been established that certain mouth bacteria play an important role in its development. Animal experiments have shown that tooth decay does not occur unless certain specific bacteria are present and that tooth decay is infectious and transmissable. These decay causing organisms can be readily destroyed or controlled by oral use of broad spectrum antibiotics, such as penicillin and the like. Unfortunately this method is not suitable because antibiotics often produce untoward side effects when used regularly and long term medication with these agents frequently results in the development of resistant strains of bacteria. In addition, such antibiotics are not sufficiently selective and destroy many useful species of oral bacteria, thus allowing other organisms, such as yeasts and fungi, to run rampant. This in turn may produce serious conditions, such as lung ailments, which may be fatal.

It has been known for some time that the presence of fluorides in very small amounts in drinking water reduces the incidence of dental caries. Also, topical application of fluoride solutions to teeth has met with considerable success. These findings have led to the large scale fluoridation of drinking water supplies in many localties where the fluoride levels are suboptimal.

One of the many difficulties encountered in the fluoridation of public water supplies resides in the fact that in many areas this water comes in contact with substances that tend to inactivate added fluorides. Thus, drinking water is frequently treated with various clays, absorbents and certain calcium, magnesium and aluminum compounds that may make the fluorine unavailable to the human organism. Fluoridation is accomplished through controlled addition of metallic fluorine compounds, such as sodium fluorosilicate, sodium fluoride, et cetera, to the water. Such compounds readily undergo ion exchange reactions that tend to bind the active fluoride ion in the form of an inactive, unavailable new compound (usually a simple or complex calcium salt thereof) while the inactive (from the decay prevention standpoint) sodium or other metal ion is released into the water.

Attempts have also been made to introduce similar metal fluorides into household items of oral hygiene, such as dentifrices, but difficulties similar to those described above have also been encountered in these efforts. Certain ingredients of dentifrices gradually inactivate the fluorine compounds incorporated into such products, with the result that the caries preventive activity of such products may decrease substantially during storage prior to use. Here too the inactivation process involves metathesis or an ion exchange reaction between the inorganic metal fluoride with another compound whereby the fluoride ion is rendered unavailable.

Even under optimum experimental conditions where there is no inactivation of the fluoride ion as described above, the use of metal fluorides is only partially successful for the reason that the favorable action of fluorides in the prevention of dental caries is entirely indirect, the fluoride ion having no direct effect upon actual cariogenic factors such as decay causing acids and bacteria responsible for the production thereof. Fluorides merely strengthen and harden tooth enamel and thus render it less susceptible to attack by decay causing acids and bacteria involved in the production thereof. While this strengthening and hardening effect is very valuable, it has no influence on the actual and direct causative factors involved in tooth decay and is accordingly only partially successful.

The vitamin $B_6$ complex is well known. This complex includes pyridoxine (5-hydroxy 6-methyl 3,4-di(hydroxymethyl) pyridine), pyridoxyl (3-hydroxy 5-hydroxymethyl 2-methyl isonicotinaldehyde), pyridoxamine (3-hydroxy 5-hydroxymethyl 2-methyl 4-aminomethyl pyridine) and codecarboxylase which is the 5-monophosphoric acid ester of pyridoxyl. These compounds, as the result of rapid, reversible interconversions thereof in vivo, may be considered to be biologically identical.

I have found that salts of pyridoxine with monofluorophosphoric acid, $H_2PFO_3$, are highly effective in the prevention of detal caries, these salts exhibiting both a direct and indirect favorable action in the prevention of dental caries.

One object of this invention is to provide new chemical compounds useful in the prevention of dental caries.

Another object of this invention is to provide new chemical compounds exhibiting both direct and indirect favorable actions in the prevention of dental caries.

A further object of this invention is to provide neutral dipyridoxine monofluorophosphate.

An additional object of this invention is to provide acid pyridoxine monofluorophosphate.

Yet another object of this invention is to provide compositions of matter containing one or more of the compounds thereof, said compositions being effective in the prevention of dental caries.

Other objects of this invention will become apparent as the description thereof proceeds.

The objects of this invention are accomplished by organic compounds of the formula:

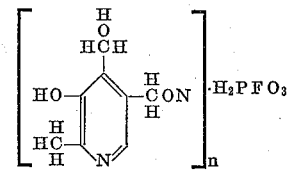

where $n$ is a whole number selected from the group consisting of one and two.

The compounds of this invention may be conveniently prepared by the reaction of sodium monofluorophosphate with pyridoxine hydrochloride or by the interaction of monofluorophosphoric acid with pyridoxine base.

For the better understanding of this invention the following illustrative but non-limiting examples thereof are given:

*Example 1*

In the preparation of dipyridoxine monofluorophosphate (above formula where $n$ is two), 14.4 g. of commercial disodium monofluorophosphate, 41.1 g. (0.2 mole) pyridoxine hydrochloride and 80 ml. of water were heated together until a clear solution resulted. The solution was cooled to 15° C., the crystalline precipitate filtered, washed with cold water and dried. The yield was 35 g.

The compound is a white, stable, non-hygroscopic crystalline product, readily soluble in water, sparingly soluble in alcohol and melting at 150–151° C. It may be recrystallized by dissolving in hot water, adding methanol and cooling. The recrystallized material melts at 153–154° C.

Assuming that the disodium monofluorophosphate employed in this example was 100% pure, the yield of crude salt obtained (35 g.) represents 80% theory. However, commercially available disodium monofluorophosphate has a $Na_2PFO_3$ content of 85–92% so the yield of crude salt produced in this example represents a theoretical yield actually somewhat above 80%.

*Example 2*

In the preparation of acid pyridoxine monofluorophosphate (above formula where $n$ is one), 10 g. of pyridoxine base was dissolved in 40 ml. of warm methanol and the solution treated with an excess (20 ml.) of monofluorophosphoric acid. The resulting mixture was stirred with 200 ml. of isopropanol, cooled to 15° C. and the precipitated compound was filtered, washed with isopropanol and dried. The yield was 10 g. (63% theory).

This new compound is also a white, stable, non-hygroscopic crystalline product, readily soluble in water, sparingly soluble in alcohol and exhibiting a melting point of 170–175° C. It may be recrystallized by dissolving in warm water and precipitating with isopropanol. The melting point of the recrystallized compound is 175° C.

*Example 3*

The respective products of Examples 1 and 2 may be interconverted, the one to the other, by appropriate reactions and manipulations which confirm the structures and the relationship between the two compounds. As an example of such a conversion, 2.69 g. (0.01 mole) of acid pyridoxine monofluorophosphate (Example 2) and 1.69 g. (0.01 mole) of pyridoxine base were dissolved in 4 ml. of hot water and the resulting solution was treated with 80 ml. of isopropanol. The precipitate was filtered, washed with isopropanol and dried. The product had a melting point of 153–154° C. which was not depressed by mixing with a sample of the dipyridoxine monofluorophosphate prepared as described in Example 1.

Methods and means for the conversion of the product of Example 1 to that of Example 2 will now be readily apparent to those skilled in the chemical art.

One or more of the compounds of this invention may be incorporated into solutions, lozenges, chewing gum, dentifrices and similar vehicles. Thus, the compounds of this invention may be incorporated into mouthwashes or may be marketed in the form of a rapidly dissolving tablet which is added to drinking water, fruit juice, milk, or the like prior to the drinking thereof.

One particularly effective method of administration of the compounds of this invention results when they are incorporated into slowly dissolving lozenges which are held in the mouth until dissolved. A similarly effective method of administration is via chewing gum. Thus, sufficient dipyridoxine monofluorophosphate and/or acid pyridoxine monofluorophosphate may be incorporated with a conventional chewing gum base to provide from say 0.0005 to 0.0015 g. equivalent fluorine in each stick of gum. Since acid pyridoxine monofluorophosphate has a fluorine content of 6.82%, a stick of gum weighing one gram may contain, on the above basis, from about 7 to 22 mg. of this compound. Similarly, since the fluorine content of dipyridoxine monofluorophosphate is 4.34%, from 11.5 to 35 mg. of this salt of lower fluorine content incorporated in a gum stick weighing one gram will provide 0.5 to 1.5 mg. equivalent fluorine per stick.

The chewing of one stick of gum, formulated as above described, each day will provide not only the recommended daily dosage of fluorine necessary to achieve the well known indirect favorable effect of this element on the prevention of dental caries but also gives rise to an even more fundamental, direct favorable effect on the prevention of dental caries as will become apparent as the description of this invention proceeds. Since the acute toxicity (on the basis of equal fluorine quantities) of the monofluorophosphate ion is only one third to one half as great as the acute toxicity of the fluoride ion, the chewing during a single day of several sticks of gum formulated as above and containing as much as 1.5 mg. fluorine per stick will have no adverse effect on the user.

The compounds of this invention may also be employed in the formulation of powder and paste type dentifrices. Paste type dentifrices generally contain from 10–40% water, 10–40% of a humectant, usually a polyhydric alcohol such as glycerine, and 20–60% of a scouring agent such as calcium pyrophosphate (dentifrice grade). Small amounts of other materials such as detergents, thickeners and flavoring extracts are also usually found in paste dentifrices. By incorporating a sufficient amount of one or more of the compounds of this invention in a paste dentifrice to produce a formula having a fluorine content within the approximate range 0.01–0.4% by weight results in a material exhibiting both direct and indirect favorable effects on the prevention of dental caries. Paste dentifrices containing from about 0.15 to 6.0% by weight acid pyridoxine monofluorophosphate or from about 0.23 to 8.6% by weight dipyridoxine monofluorophosphate will have fluorine contents in the range 0.01 to 0.4%. It is preferred that the paste contain in the neighborhood of 0.1% fluorine, equivalent to a content of about 1.5% by weight acid pyridoxine monofluorophosphate or about 2.3% by weight dipyridoxine monofluorophosphate.

The compounds of my invention have the usual indirect favorable effect on the prevention of dental caries exhibited by fluorine containing compounds of the prior art such as stannous fluoride and sodium fluoride. As previously stated, the indirect favorable effect is the result of strengthening and hardening of the tooth enamel, thus making it less susceptible to attack by decay causing acids and bacteria involved in the production of such acids.

In addition to this indirect favorable effect and of even greater importance, the compounds of my invention have a direct favorable effect on the prevention of dental caries not manifested by prior art fluorine compounds. It is believed that this direct favorable effect of the compounds of my invention is the result of a favorable modification of the oral flora due to the action of the pyridoxine moiety of said compounds. While the explanation of the direct favorable action of the compounds of my invention is believed to be correct it is based to a certain degree upon theoretical considerations and I do not wish to be bound by any theory offered.

The presence of the pyridoxine moiety of the compounds of my invention brings about a fundamental and favorable change in the oral flora, the population of homofermentative cariogenic bacteria, such as *Lactobacillus acidophilus*, being reduced while the population of heterofermentative non-cariogenic bacteria, such a *L. casei*, increases. *L. casei* requires the pyridoxine moiety for growth and the growth of this bacillus is, within limits, proportional to the amount of this essential nutrient present. *L. acidophilus* does not require the pyridoxine moiety for growth and in mixed populations containing both *L. acidophilus* and *L. casei* a goodly supply of pyridoxine tends to suppress the acidophilus population due probably to the mass action effect of the simultaneously increased population of *L. casei*.

It will be noted that acid pyridoxine monofluorophosphate contains almost 9 mg. of the pyridoxine moiety per milligram of fluorine content and similarly the dipyridoxine monofluorophosphate contains almost 18 mg. of the pyridoxine moiety per milligram fluorine content. Accordingly, it is seen that a lozenge or stick of chewing gum containing a sufficient amount of a compound of this invention to provide 1 mg. fluorine provides the pyridoxine moiety in an amount more than adequate to supply the daily requirements of humans for this material. Also, it is evident that by the very nature of the method of administration here employed the compounds of this invention are retained in contact with the dental plaque over considerable periods of time. Although the quantity of tooth paste applied to the brush varies with the individual it is seen that one gram of a tooth paste containing 0.1% by weight fluorine supplied by one or more of the compounds of this invention will furnish 9 to 18 mg. of the pyridoxine moiety. Routine use of a composition containing one or more compounds of this invention will furnish sufficient of the pyridoxine moiety to secure the favorable direct effect of the compounds of this invention even in those instances where previously a deficiency of vitamin $B_6$ existed due to a poor diet, nervous tension, use of certain therapeutic agents, pregnancy, et cetera.

It is seen that the overall effect of the compounds of this invention is to strengthen the tooth against cariogenic agents and simultaneously to weaken the intensity of the attack by such agents. The value and effectiveness of this dual type of anti-caries activity is evident. The strengthening of the tooth enamel with concurrent reduction of cariogenic agents is obviously a highly desirable and highly effective method of combatting tooth decay.

As would be expected in view of the above discussion, the full benefits that follow the employment of the compounds of my invention are not revealed by conventional in vitro testing procedures. Thus, measuring the rate of attack, in vitro, of an acid on a sample of tooth enamel that has been treated with a compound of this invention measures only the indirect favorable action of said compound and accordingly would indicate that the compounds of this invention are similar in activity to the exclusively indirect acting compounds of the prior art such as stannous fluoride and sodium fluoride. However, the great superiority of the compounds of this invention over prior art compounds is revealed by biological testing under conditions of actual use, employing either human or animal (e.g., hamster) subjects. Such tests not only reveal the superiority of the compounds of this invention over the exclusively indirect acting compounds of the prior art but also clearly indicate that the favorable action of the compounds of this invention is greater than is to be expected on the basis of the sum of the individual actions of the pyridoxine moiety and the fluorine containing moiety. It is believed that this observed synergism is due in some measure to the unusual composition of the fluorine containing moiety, i.e., the $PFO_3^{--}$ ion, particularly to the phosphorus content thereof and even more to the presence of the modified phosphate ion.

An obvious corollary advantage of the combined direct and indirect acting compounds of this invention is that a significant and useful portion of their activity is retained even under highly adverse circumstances. Thus, as pointed out previously, in the presence of certain substances in drinking water or in the diet or in products of oral hygiene, the fluoride ion may become bound and physiologically unavailable. Only the anion is biologically active in inorganic fluorine compounds of the prior art such as sodium fluoride, stannous fluoride, and the like. Accordingly, the binding of the anion renders these compounds biologically inactive. In contrast, both the cationic and the anionic moieties of the compounds of this invention are biologically active. Accordingly, these compounds preserve a substantial part of their activity even when the availability of the fluorine containing moiety is reduced or destroyed since conditions which affect the availability of fluorine to the organism have no effect upon the biological availability of pyridoxine.

Since the pyridoxine moiety of the compounds of this invention actually acts topically in the oral cavity it is doubtful if even the most severe vitamin $B_6$ deficiency would have any adverse effect on the direct favorable effect of the compounds of this invention in the prevention of tooth decay. However, in the unlikely event that conditions affecting adversely the availability of vitamin $B_6$ to the organism (such as stress, hormone medication, pregnancy, and the like) had a simultaneous adverse effect on the direct activity of the compounds of this invention in the prevention of dental caries, even so the indirect favorable action of these compounds would remain since such conditions have no adverse effect on the biological availability of the fluorine bearing moiety of the compounds of this invention.

Be it remembered that while this invention has been described in connection with specific details and specific embodiments thereof, these details and embodiments are illustrative only and are not to be considered limitations on the spirit and scope of said invention except in so far as these may be incorporated in the appended claims.

I claim:
1. Monofluorophosphoric acid salts of members of the vitamin $B_6$ complex.
2. Monofluorophosphoric acid salts of pyridoxine.
3. Dipyridoxine monofluorophosphate.
4. Acid pyridoxine monofluorophosphate.

References Cited by the Examiner
UNITED STATES PATENTS

| | | | |
|---|---|---|---|
| 2,422,622 | 6/47 | Harris | 260—297.5 |
| 2,732,379 | 1/56 | Webb | 260—297.5 |
| 3,105,013 | 9/63 | Saul | 167—93 |
| 3,105,798 | 10/63 | Holliday | 167—93 |
| 3,119,743 | 1/64 | Ericsson | 167—93 |

FOREIGN PATENTS

| | | |
|---|---|---|
| 547,208 | 5/56 | Belgium. |

OTHER REFERENCES
Newton: Chem. Abst., vol. 50, 1956, page 10289d.
Shourie et al.: J. Dent. Res., vol. 29, pp. 523–533 (1950).

WALTER A. MODANCE, *Primary Examiner.*
FRANK CACCIAPAGLIA, JR., *Examiner.*